United States Patent
Anderson

(10) Patent No.: US 6,177,958 B1
(45) Date of Patent: Jan. 23, 2001

(54) SYSTEM AND METHOD FOR THE AUTOMATIC CAPTURE OF SALIENT STILL IMAGES

(75) Inventor: Eric Anderson, San Jose, CA (US)

(73) Assignee: FlashPoint Technology, Inc., San Jose, CA (US)

( * ) Notice: Under 35 U.S.C. 154(b), the term of this patent shall be extended for 0 days.

(21) Appl. No.: 09/038,079

(22) Filed: Mar. 11, 1998

(51) Int. Cl.⁷ ..................................................... G03B 7/00
(52) U.S. Cl. ................ 348/362; 348/333.04; 348/333.11
(58) Field of Search ..................................... 348/362, 229, 348/221, 365, 364, 363, 333, 333.01, 333.02, 333.04, 333.11, 333.12; G03B 7/00

(56) References Cited

U.S. PATENT DOCUMENTS

| 5,043,816 | * | 8/1991 | Nakano et al. | 348/333 |
| 5,223,935 | * | 6/1993 | Tsuji et al. | 348/364 |
| 5,309,243 | * | 5/1994 | Tsai | 348/362 |
| 5,420,635 | * | 5/1995 | Konishi et al. | 348/362 |
| 5,475,428 | | 12/1995 | Hintz et al. | 348/263 |
| 5,477,264 | | 12/1995 | Sarbadhikari et al. | 348/231 |
| 5,493,335 | | 2/1996 | Parulski et al. | 348/233 |
| 5,633,678 | | 5/1997 | Parulski et al. . | |
| 5,638,123 | * | 6/1997 | Yamaguchi | 348/364 |
| 5,703,644 | * | 12/1997 | Mori et al. | 348/363 |
| 5,796,428 | * | 8/1998 | Matsumoto et al. | 348/231 |
| 5,801,773 | * | 9/1998 | Ikeda | 348/362 |
| 5,828,793 | * | 10/1998 | Mann | 348/284 |
| 5,963,670 | * | 10/1999 | Lipson et al. | 382/224 |
| 5,969,761 | * | 10/1999 | Takahashi et al. | 348/362 |
| 5,986,701 | * | 11/1999 | Anderson et al. | 348/232 |

FOREIGN PATENT DOCUMENTS 8-32847 * 2/1996 (JP) ........................... H04N/5/225

* cited by examiner

Primary Examiner—Wendy Garber
Assistant Examiner—Aung S. Moe
(74) Attorney, Agent, or Firm—Sawyer Law Group LLP

(57) ABSTRACT

A system and method for the automatic capture of salient still images in an electronic imaging device includes detecting a high contrast image, notifying a user of the presence of the high contrast image, and capturing a plurality of salient still images to increase the dynamic range of the electronic imaging device. In addition, the system having an exposure control coupled to the electronic imaging device for selecting salient still capture mode, and determined a mode of operation for the capture of the salient still images, and storing the salient still images in a computer readable storage medium.

23 Claims, 16 Drawing Sheets

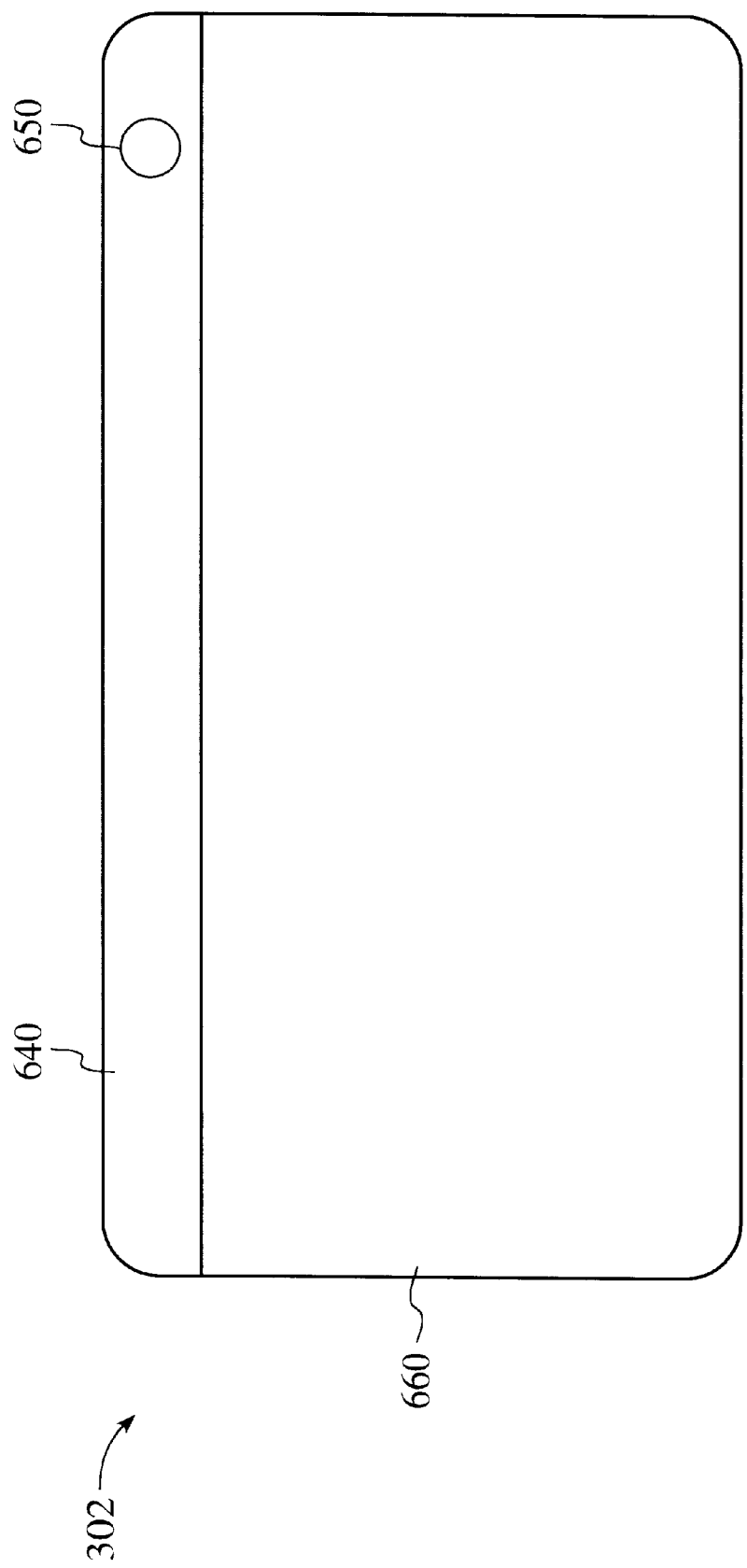

SYSTEM AND METHOD FOR THE AUTOMATIC CAPTURE OF SALIENT STILL IMAGES

BACKGROUND OF THE INVENTION

1. Field of the Invention

This invention relates generally to electronic imaging devices and more particularly to a system and method for the automatic capture of salient still images by an electronic imaging device.

2. Description of the Background Art

One of the advantages of digital cameras is their ability to capture images of objects for later manipulation by computer graphics programs. However, digital cameras have a limited dynamic range of exposure sensitivity.

In conventional photography, photographic films capture a wide range of light exposure levels. These films capture detail in both shadow or dark areas and light or bright areas with a single camera exposure of the film. Digital cameras, however, have a much narrower dynamic range due to the use of a charged-coupled device (CCD.) Thus, unlike conventional photographic exposure that captures shadow detail without washing-out image highlights in a high contrast scene, a digital camera will lose a substantial amount of detail in either the darkest areas of the image, or in the brightest areas, or both.

Conventionally, photographers employ a manual method of camera operation known as "bracketing" of exposure setting to record images on photographic film. A photographer takes a first picture at a first exposure setting by adjusting the f-stop on the camera lens and/or the shutter speed dial on the camera body. The photographer then takes a second picture at a second exposure setting for a different light level by changing the f-stop and/or shutter speed. The first exposure setting admits more light for the first picture while the second exposure setting admits less light for the second picture, or vice versa. Thus, the image is said to be "bracketed" between these two settings.

One of the bracketed images on the developed photographic film reveals more detail in the darker areas of the picture while the other bracketed image reveals more detail in the lighter areas. The photographer chooses which of the bracketed images appears best, but conventional photographic methods do not provide any method of combining the images at time of capture to produce the best detail of each. The prior art, however, provides for methods of digitizing the images after the film is developed. Once the bracketed exposures are digitized, a variety of post-production editing programs are available to combine the images.

Automatic cameras allow the photographer to "auto-bracket" a given image. The photographer sets the range of the bracketing feature (the X factor.) The camera's auto-bracketing feature then captures a series of images, typically one at the auto metered point, plus one on either side of the metered exposure (usually at +X and −X.) The photographer may then choose which of the images captured by the autobracketing feature to keep, based on the resulting images after processing.

What is required is a method to automatically calculate the need for bracketing, and to calculate the bracketed exposures to capture the image in its full detail. In addition, what is required is a method to put the image data in a form that the computer software may automatically recognize and change into a single, distortion-free image.

SUMMARY OF THE INVENTION

The present invention relates to an improvement in digital imaging devices, including digital cameras, and comprises a system and method for the automatic capture of salient still images.

A user initially sets an exposure control coupled to the electronic imaging device for selecting a salient still capture mode. During operation, a camera control sub-system detects a high contrast image. The camera control sub-system notifies a control application that the camera control sub-system has detected the high contrast image. The control application responsively notifies the user that a high contrast image has been detected. Then, the imaging device determines which of two salient still capture modes has been selected: (1) salient still capture automatic mode, or (2) salient still capture manual mode.

During salient still capture automatic mode, the present invention automatically captures a plurality of salient still images. In one embodiment, the auto-exposure (AE) mechanism of the camera determines an average exposure value of the high contrast image. The invention then captures two images based upon the auto-exposure value. The camera exposes the first salient still image to capture the dark image data of the high contrast image and exposes the second salient still image to capture the bright image data of the high contrast image.

A capture manager automatically adjusts the exposure setting for the first salient image by setting the exposure a pre-set value below (−X) the auto-exposure average value to capture the dark image. The capture manager then automatically adjusts the exposure setting for the second salient image by setting the exposure a pre-set value above (+X) the autoexposure average value to capture the bright image. These exposures are hopefully far enough apart to capture the dark and bright image data while maintaining an optimum image overlap in order to capture adequate image detail. In the preferred embodiment, the +X and −X values are loaded during initial camera set-up.

In a second embodiment, the AE mechanism determines an auto-exposure dark value and an auto-exposure bright value of the high contrast image. The AE mechanism then subtracts the auto-exposure dark value from the auto-exposure bright value, divides the result by two, and uses this mean value as the AE average. The AE mechanism then determines the number of images to capture based upon the difference between the auto-exposure dark value and the auto-exposure bright value. If the difference exceeds the dynamic range of the two captures with overlap, then three or more images are required.

In either embodiment, the captured images are tagged as salient images and grouped together. Preferably, the grouped files are stored in salient image folders either during or after capture process is completed. The two salient images are later combined into a single digital image by software routines. Alternatively, the images are combined during initial processing and stored as a single image.

During salient still capture manual mode, the present invention offers the user a choice of whether or not to capture two salient still images. If the user selects to capture the two salient still images, the invention proceeds as in automatic mode. On the other hand, if the user does not enable the dual capture, then only a single image will be captured.

Thus, the present invention provides a method to automatically calculate the need for bracketing, and to calculate the bracketed exposures to capture a high contrast image in its full detail. In addition, the present invention provides a method to put the image data in a form that the computer software may automatically recognize and change into a single, distortion-free image.

BRIEF DESCRIPTION OF THE DRAWINGS

FIG. 6(c) is a plan view of the view screen of FIG. 6(a);

DETAILED DESCRIPTION OF THE PREFERRED EMBODIMENT

The present invention relates to an improvement in digital imaging devices, including digital cameras. The following description is presented to enable one of ordinary skill in the art to make and use the invention and is provided in the context of a patent application and its requirements. Although the present invention will be described in the context of a digital camera, various modifications to the preferred embodiment will be readily apparent to those skilled in the art and the generic principles herein may be applied to other embodiments. That is, any image capture device which displays images, icons and/or other items, could incorporate the features described hereinbelow and that device would be within the spirit and scope of the present invention. Thus, the present invention is not intended to be limited to the embodiment shown but is to be accorded the widest scope consistent with the principles and features described herein.

The present invention comprises a system and method for the automatic capture of salient still images by a digital imaging device. The invention comprises means for detecting a high contrast image, means for notifying a user of the presence of the high contrast image, and a means for capturing a plurality of salient still images to increase the dynamic range of the electronic imaging device. In addition, the invention comprises an exposure control coupled to said electronic imaging device for selecting salient still capture mode, means for determining a mode of operation for the capture of the salient still images, and means for storing the salient still images in a computer-readable storage medium.

Figure 1:
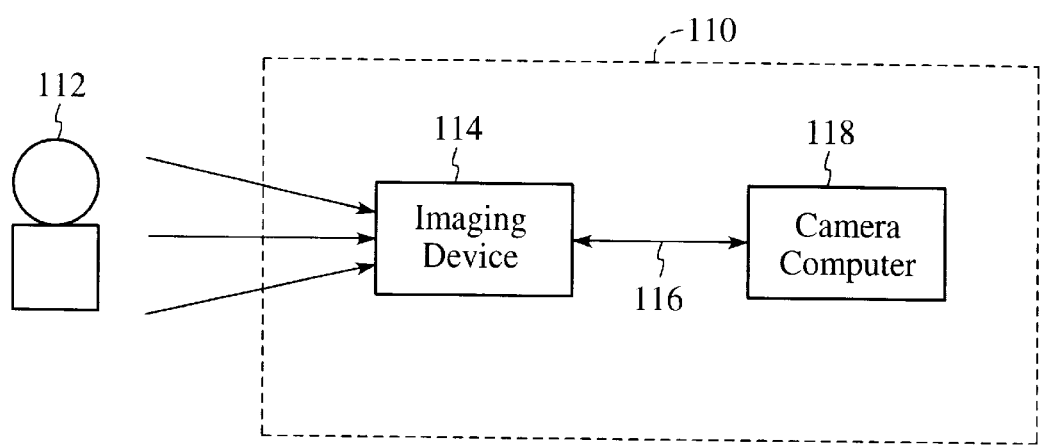
FIG. 1 is a block diagram of a digital camera.

Referring to FIG. 1, a block diagram of a digital camera 110 connected to a host computer 120 is shown. Camera 110 preferably comprises an imaging capture device 114, a system bus 116, and a camera computer 118. Imaging capture device 114 is optically coupled to an object 112 and electrically coupled via system bus 116 to camera computer 118. Once a user has focused imaging capture device 114 on object 112 and instructed camera 110 to capture an image of object 112, camera computer 118 commands imaging capture device 114 via system bus 116 to capture image data representing object 112. The captured image data is transferred over system bus 116 to camera computer 118 which performs image processing functions on the image data. System bus 116 also passes various status and control signals between imaging capture device 114 and camera computer 118.

Figure 2:
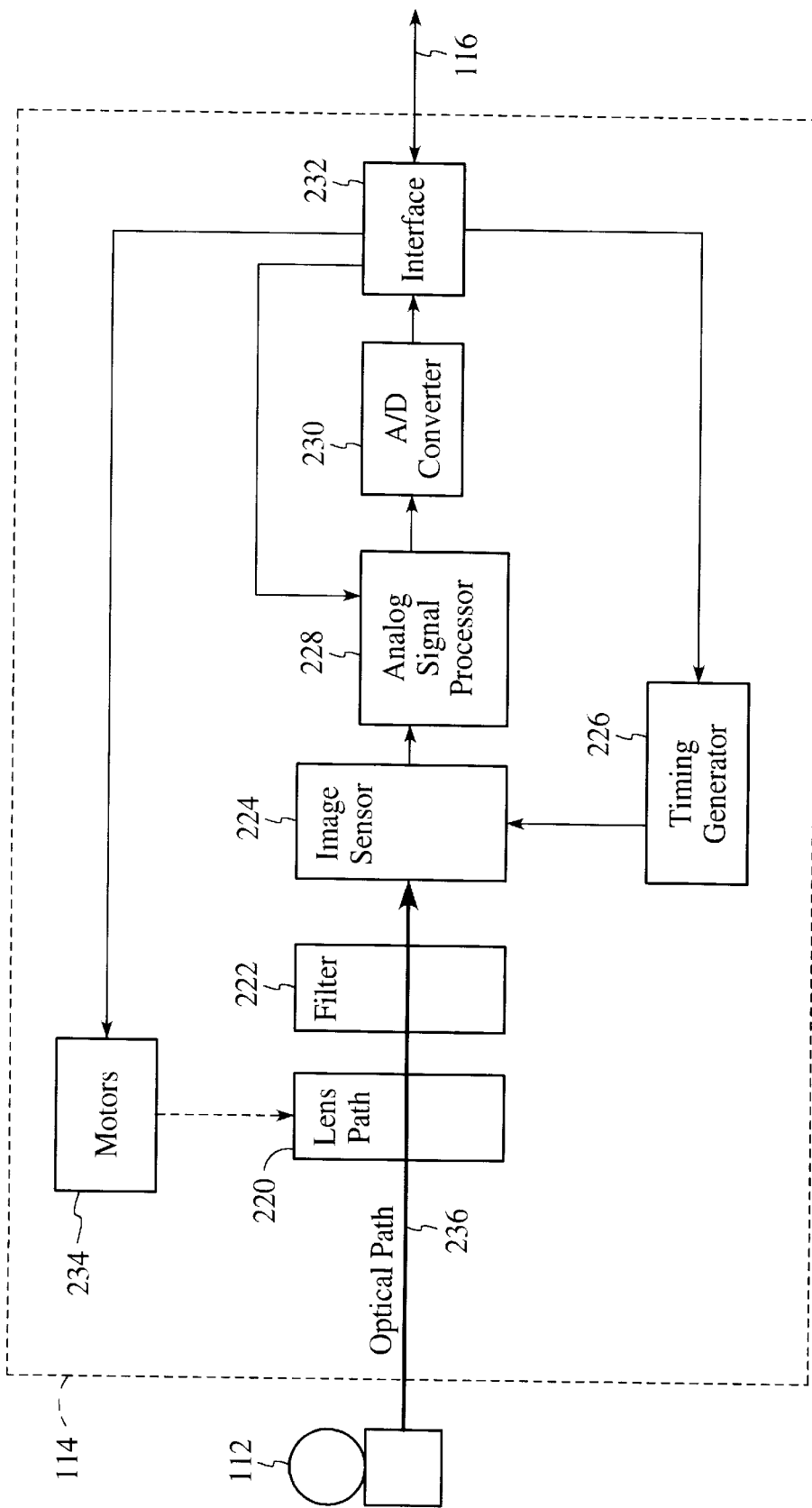
FIG. 2 is a block diagram of the imaging device of FIG. 1.

Referring now to FIG. 2, a block diagram of one embodiment of imaging capture device 114 is shown. Imaging capture device 114 typically comprises a lens 220 having an iris (not shown), a filter 222, an image sensor 224, a timing generator 226, an analog signal processor (ASP) 228, an analog-to-digital (A/D) converter 230, an interface 232, and one or more motors 234.

Imaging capture device 114 captures an image of object 112 via light incident on image sensor 224 along optical path 236. Image sensor 224, which is typically a conventional charged-coupled device (CCD), responsively generates image data in CCD format representing the captured image 112. The image data is then routed through ASP 228, A/D converter 230 and interface 232. Interface 232 has outputs for controlling ASP 228, motors 234 and timing generator 226. From interface 232, image data passes over system bus 116 to camera computer 118.

Figure 3:
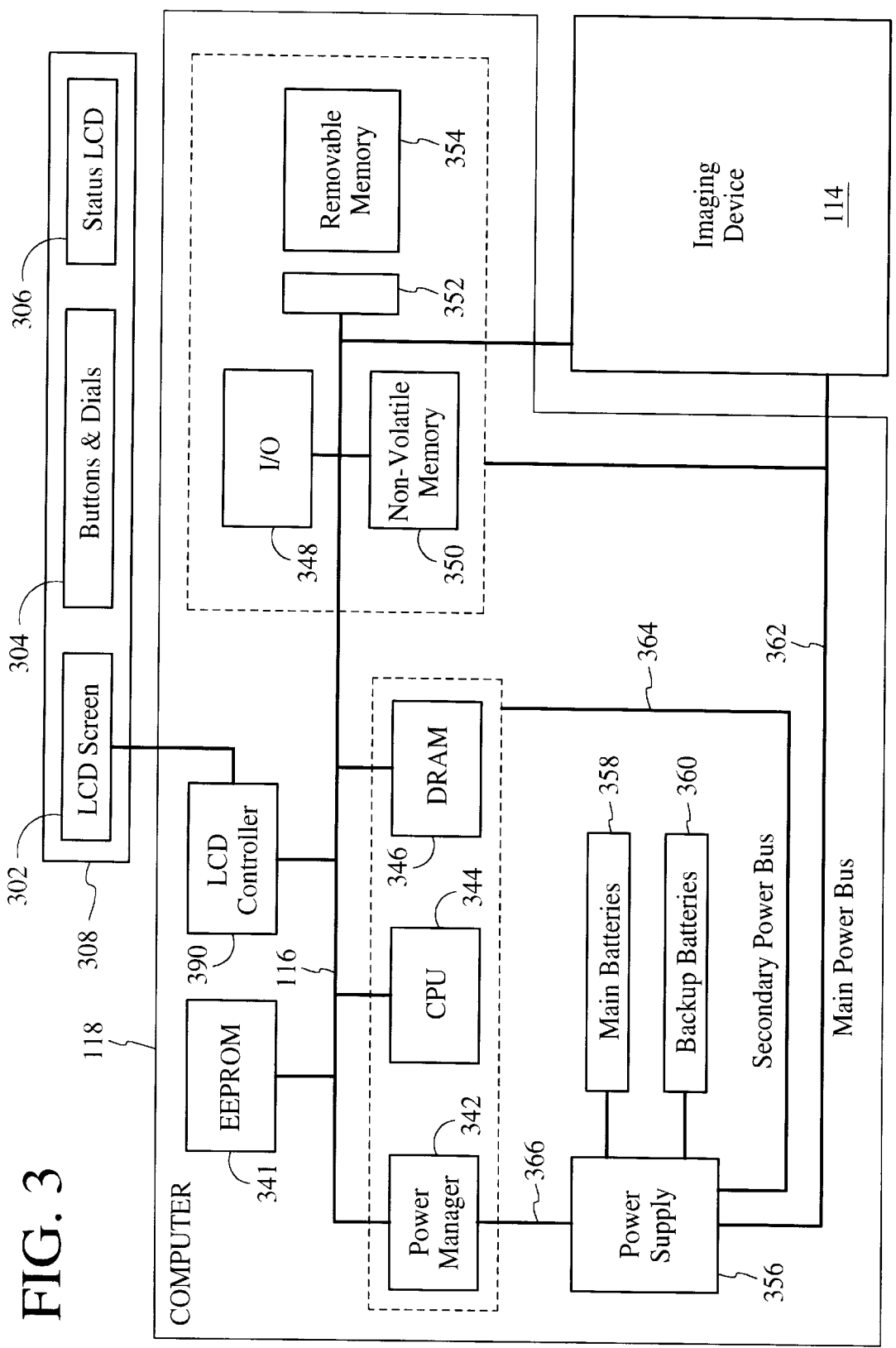
FIG. 3 is a block diagram of the camera computer of FIG. 1.

Referring now to FIG. 3, a block diagram of one embodiment for camera computer 118 is shown. System bus 116 provides connection paths between imaging capture device 114, electrically-erasable programmable read-only memory (EEPROM) 341, an optional power manager 342, central processing unit (CPU) 344, dynamic random-access memory (DRAM) 346, camera input/output (I/O) 348, non-volatile memory 350, and buffers/connector 352. Removable memory 354 connects to system bus 116 via buffers/connector 352. In alternate embodiments, removable memory 354 and/or buffers/connector 352 are omitted.

Power manager 342 communicates via line 366 with power supply 356 and coordinates power management operations for camera 110. CPU 344 typically includes a conventional processor device for controlling the operation of camera 110. CPU 344 is capable of concurrently running multiple software routines to control the various processes of camera 110 within a multi-threading environment. DRAM 346 is a contiguous block of dynamic memory, which may be selectively allocated to various storage functions. LCD controller 390 accesses DRAM 346 and transfers processed image data to LCD screen 302 for display.

Camera I/O 348 is an interface device allowing communications to and from camera computer 118. For example, camera I/O 348 permits an external host computer (not shown) to connect to and communicate with camera computer 118. Camera I/O 348 also interfaces with a plurality of buttons and/or dials 304, and an optional status LCD 306, which, in addition to LCD screen 302, are the hardware elements of the camera's user interface 308.

Non-volatile memory 350, preferably a conventional read-only memory or flash memory, stores a set of computer-readable program instructions to control the operation of camera 110. Removable memory 354 serves as an additional image data storage area and is preferably a non-volatile device, readily removable and replaceable by a camera 110 user via buffers/connector 352. Thus, a user may replace a full removable memory 354 with an empty removable memory 354 to effectively expand the picture-taking capacity of digital camera 110. Preferably, removable memory 354 is a flash disk.

Power supply 356 supplies operating power to the various components of camera 110 and also provides operating power to main power bus 362 and secondary power bus 364. The main power bus 362 sends power to imaging capture device 114, camera I/O 348, non-volatile memory 350 and removable memory 354. The secondary power bus 364 conducts power to power manager 342, CPU 344 and DRAM 346.

Power supply 356 is connected to main batteries 358 and backup batteries 360. A user may optionally attach power supply 356 to an external power source. During normal operation of power supply 356, the main batteries 358 provide operating power to power supply 356 which then provides the operating power to camera 110 via both main power bus 362 and secondary power bus 364. During a power failure mode in which the main batteries 358 have failed (when their output voltage has fallen below a minimum operational voltage level), the backup batteries 360 provide operating power to power supply 356 which then provides the operating power to the secondary power bus 364 only.

Figure 4:
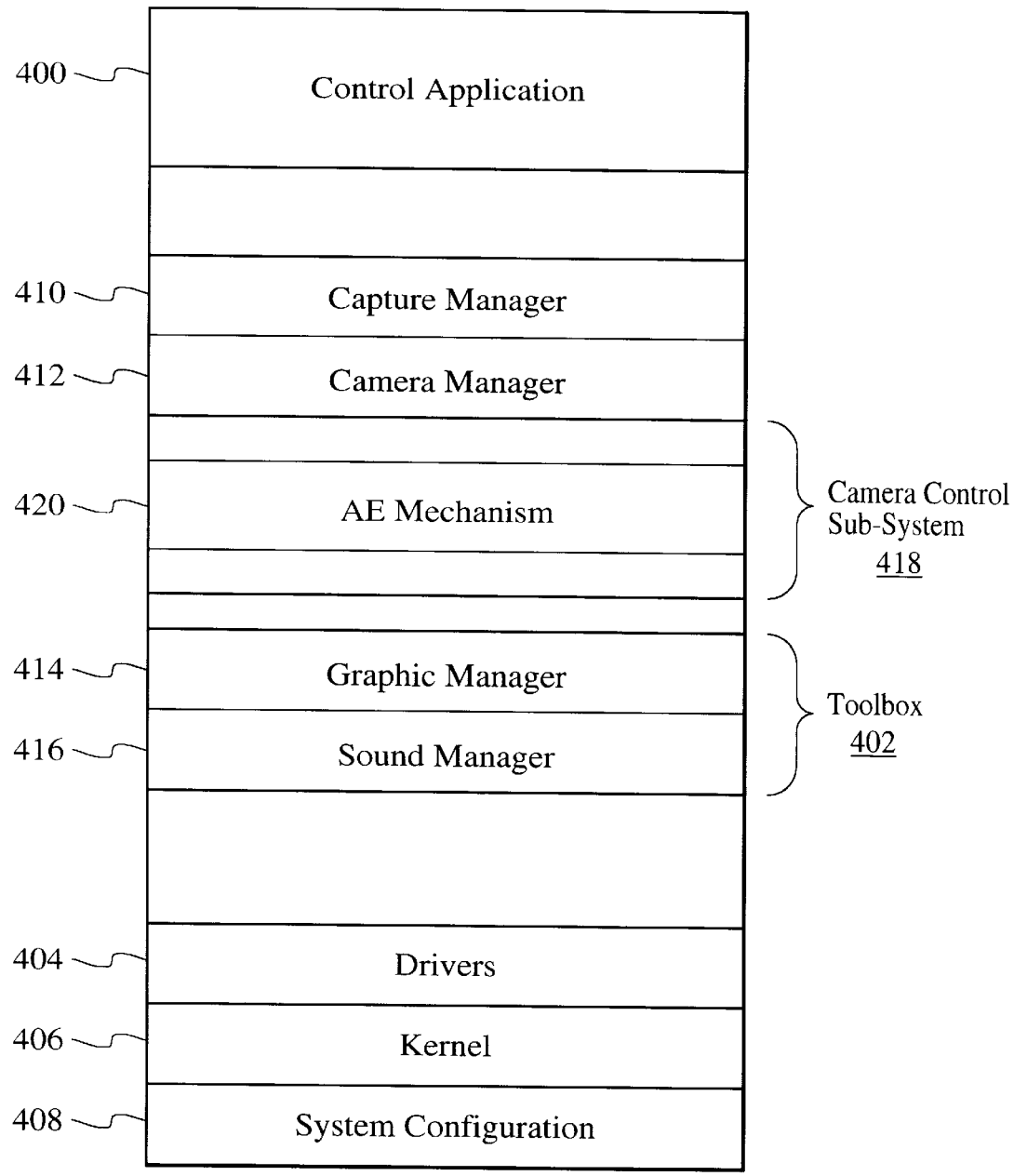
FIG. 4 is a diagram illustrating the software stored in the non-volatile memory of FIG. 3.

Referring now to FIG. 4, a diagram illustrating the software stored in non-volatile memory 350 is shown. Non-volatile memory 350 includes control application 400, camera control sub-system 418, capture manager 410, camera manager 412, toolbox 402, drivers 404, kernel 406, and system configuration 408. Control application 400 comprises program instructions for controlling and coordinating functions of camera 110. Camera control sub-system 4-18 contains selected control modules including auto-exposure (AE) mechanism 420. Toolbox 402 contains selected function modules including graphic toolbox 414 and sound toolbox 416.

Control application 400 includes software routines which coordinate functions related to user interface 308, including displaying information on LCD screen 302 and handling information input from buttons and dials 304. Capture manager 410 includes software routines which capture salient still images and stores them in DRAM 346. Camera manager 412 includes software routines to inform camera control sub-system 418 of global parameter values and to provide the interface to camera control sub-system for the system. AE mechanism 420 includes the software routines for calculating auto-exposure values and detecting high dynamic range conditions.

Drivers 404 control various hardware devices within camera 110 (for example, motors 234). Kernel 406 provides basic services for the operating system of camera 110. System configuration 408 performs initial start-up routines for camera 110, including the boot routine and initial system diagnostics.

Figure 5:
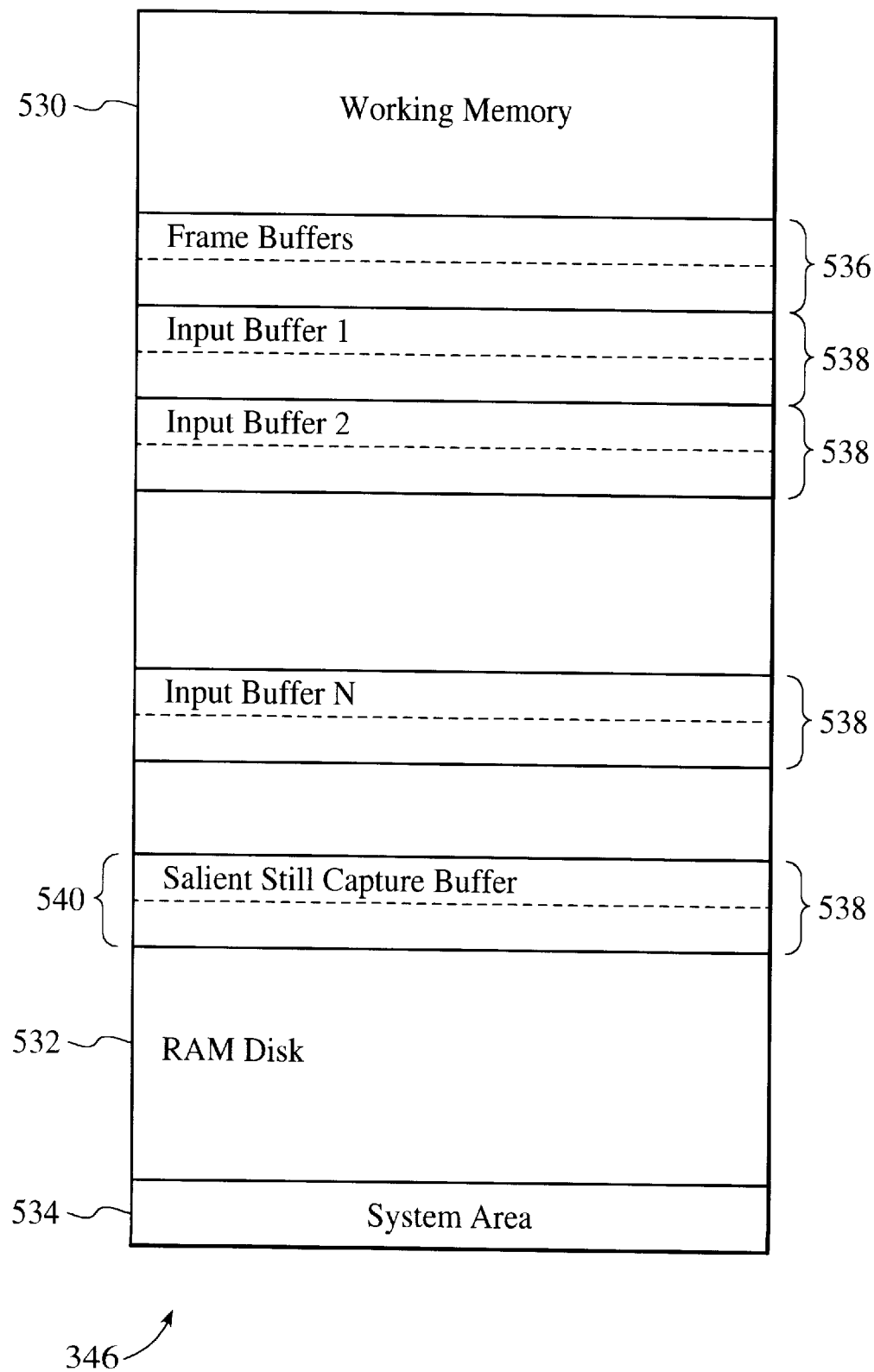
FIG. 5 is a memory map of the dynamic random-access memory of FIG. 3.

Now referring to FIG. 5, a memory map of dynamic random-access-memory (DRAM) 346 is shown. DRAM 346 includes RAM disk 532, system area 534, and working memory 530.

RAM disk 532 is a memory area used for storing raw and compressed image data and is organized in a "sectored" format similar to that of conventional hard disk drives. A conventional and standardized file system permits external host computer systems, via I/O 348, to recognize and access the data stored on RAM disk 532. System area 534 stores data regarding system errors (e.g., why a system shutdown occurred) for use by CPU 344 to restart computer 118.

Working memory 530 includes stacks, data structures and variables used by CPU 344 while executing the software routines used within camera computer 118. Working memory 530 also includes input buffers 538 for initially storing sets of image data received from imaging device 114 for image conversion, and frame buffers 536 for storing data to display on LCD screen 302. Input buffers 538 include salient still capture buffers 540 for storing data from the salient still capture process. Alternatively, one input buffer may be used where processing is fast enough to enable rapid capture due to hardware acceleration or to very high speed CPU.

Control application 400 captures object 112 into salient still image buffer 540. Software is stored in non-volatile memory 350 and executed on CPU 344. However, those skilled in the art will recognize that the capture process may also be hardware implemented.

Figure 6A:
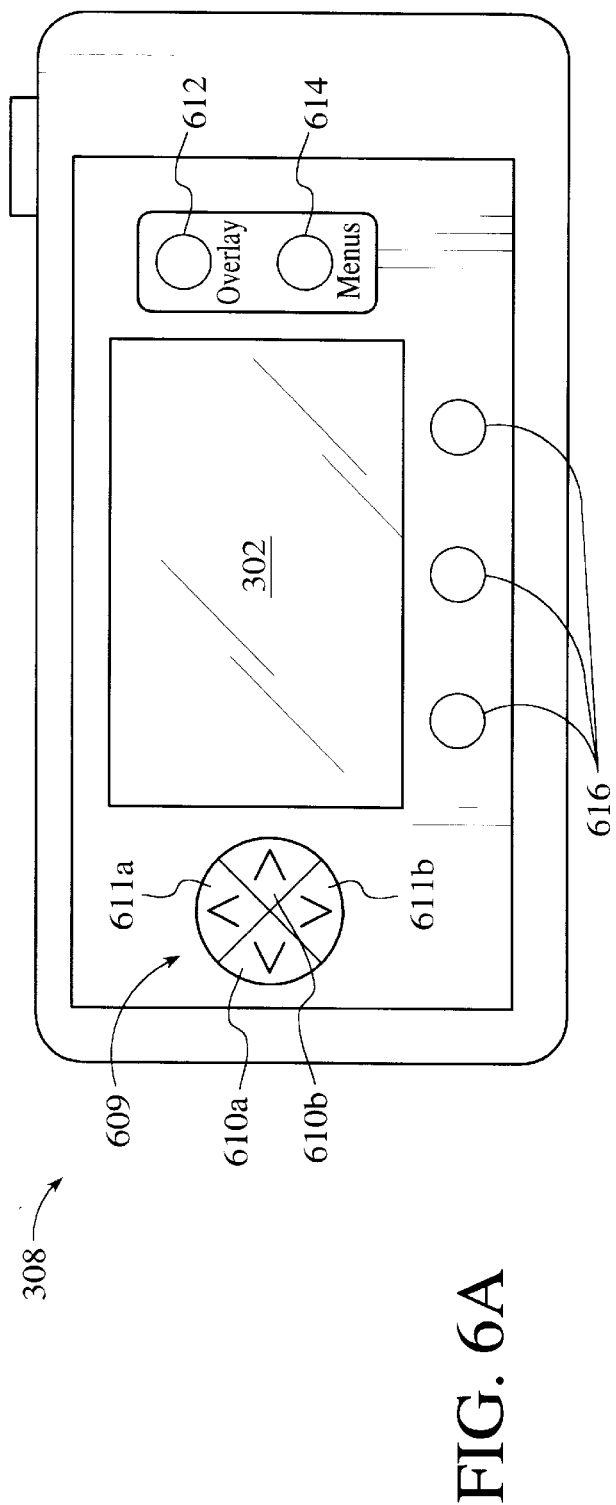
FIG. 6(a) is a rear elevation view of the camera.
Figure 6B:
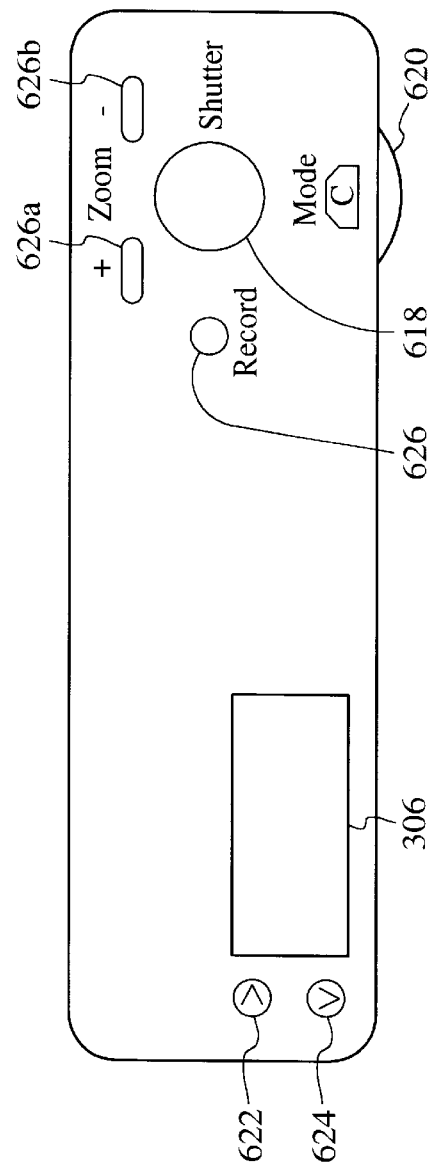
FIG. 6(b) is a top plan view of the camera.

FIGS. 6(a), 6(b), and 6(c) depict hardware components of user interface 308 of camera 110. FIG. 6(a) is a rear view of camera 110 showing, in the preferred embodiment, LCD screen 302, a four-way navigation control button 609, an overlay button 612, a menu button 614, and a set of programmable soft keys 616. In an alternative embodiment, an optical viewfinder may be used in place of LCD screen 302. In the alternative embodiment, an LED warning indicator may be used in the optical viewfinder with an additional audio signal. FIG. 6(b) is a top view of camera 110 showing a shutter button 618, and a mode dial 620. The camera optionally includes status LCD 306, status LCD scroll and select buttons 622 and 624, a sound record button 626, and zoom-in, zoom-out buttons 626a and 626b.

FIG. 6(c) is an expanded view of LCD screen 302 showing a salient still capture mode text warning area 640, salient still capture mode warning indicator 650, and screen image display area 660. The present invention optionally incorporates an audio warning (not shown). All three warning devices notify the user that salient still capture mode is in operation and that the display of object 112 may take longer than normal operation. Also, any combination of the three warning types is possible.

User interface 308 includes several operating modes for supporting various camera functions. Among these are manual salient still capture mode and automatic salient still capture mode. The user switches between the camera modes by selecting a menu option using menu button 614 that displays a selection menu on image display area 660. The user then selects the desired salient still capture mode and closes the menu. When the camera is placed into a particular mode, default screen images for that mode appear on LCD screen 302 (e.g., icons and text). Alternatively, programmable soft keys 616 may be used to select capture mode or type.

Figure 7:
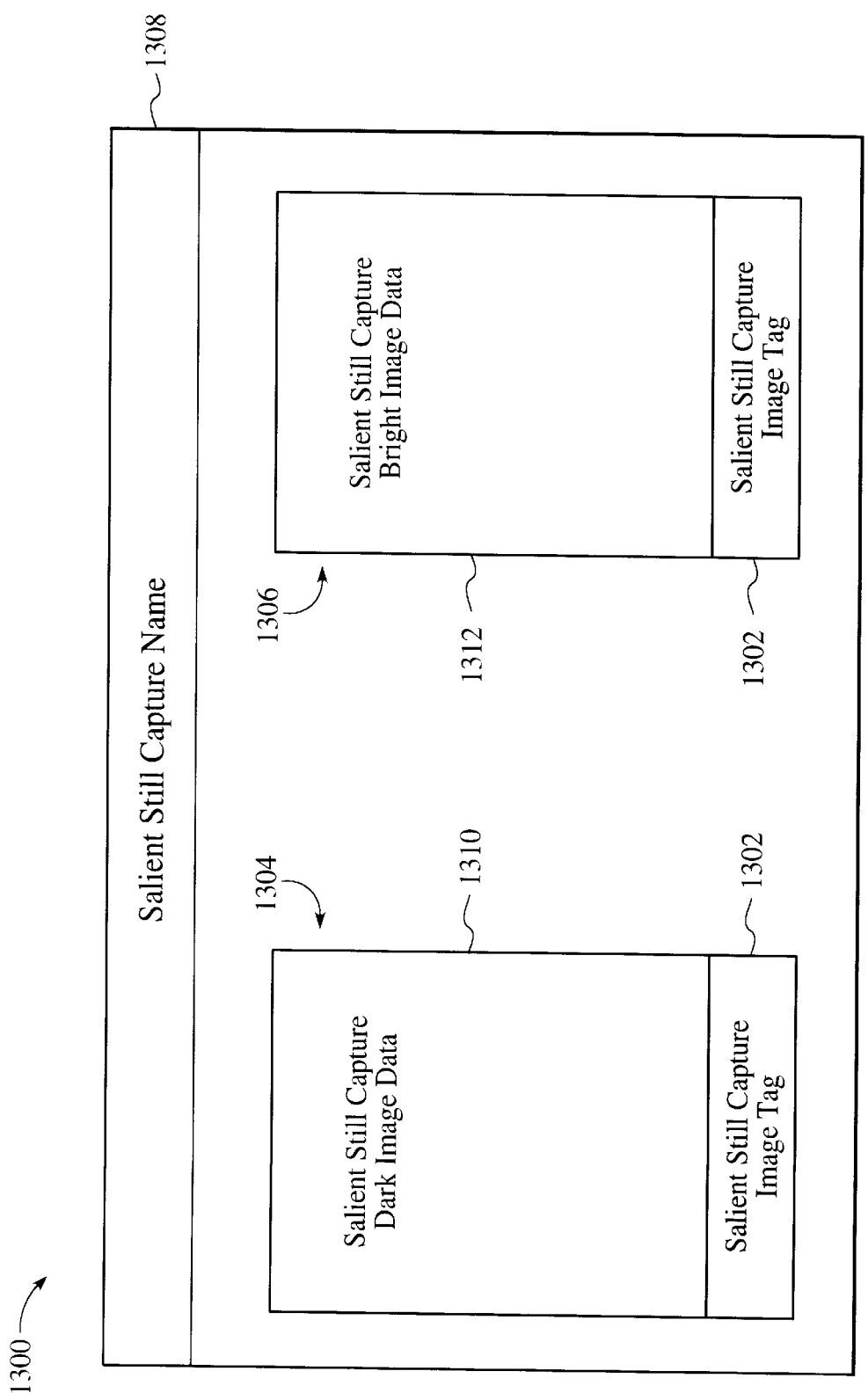
FIG. 7 is a block diagram of one embodiment for the salient still capture image folders, according to the present invention.

Referring now to FIG. 7, a block diagram of one embodiment for salient still capture image folder 1300 is shown. Both dark image file 1304 and bright image file 1306 are marked as salient still capture images by appending salient still capture image tag 1302 to files 1304, 1306. Dark image file 1304 contains salient still capture dark image data 1310 and bright image file 1306 contains salient still capture bright image data 1312. In the preferred embodiment, salient still capture image folder 1300 contains two salient still images. Alternatively, salient still capture image folder 1300 may contain multiple salient still images. Tagged files 1304, 1306 are stored together in salient still capture image folder 1300 which has a default salient still capture name 1308 that identifies the images within the specific folder as salient still capture images.

Salient still capture image folders 1300 may be uniquely named to indicate that they are salient still capture folders 1300. Alternatively, only salient still capture image tags 1302 are used and the images are stored together. However, with the alternative method, the images are more difficult to locate and retrieve than with the preferred method of using both salient still capture image tags 1302 and uniquely identifying salient still capture image folders 1300 with salient still capture name 1308. Salient still capture image folder 1300 is stored in DRAM 346 or, alternatively, in removable memory 354.

Figure 8A:
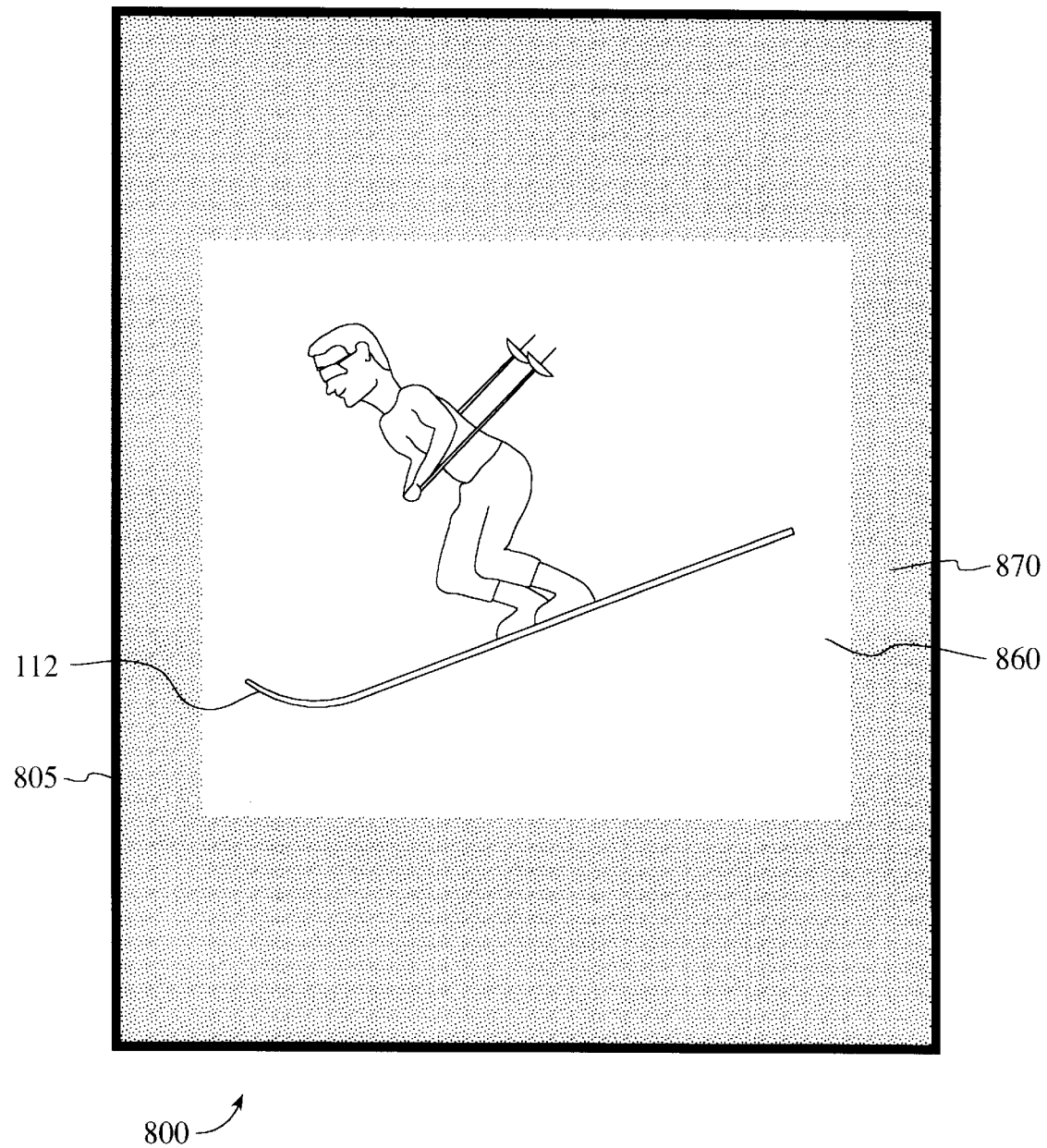
FIG. 8(a) is a representation of a high contrast object.

Referring now to FIG. 8(a), a representation of high contrast image 800 of object scene 112 is shown as viewed by the user through an opening or boundary 805. Such high contrast images 800 commonly occur when the user attempts to capture object 112 through the end of a tunnel or an open window, for example. This situation creates a high contrast of light levels between bright area 860 and dark area 870 of scene 800. Because of the dramatic contrast of light levels between the two areas, camera 110 detects light area 860 around object 112 as extreme bright and detects dark area 870 inside opening 805 as black. In such a situation, camera 110 detects little or no detail in either dark area 870 or light area 860, depending upon the capabilities of camera 110. To the user, bright area 860 appears "washed-out," dark area 870 appears black, or both. This condition only occurs when the light levels in the two areas are far apart, beyond the dynamic range of the CCD or sensing device.

Figure 8B:
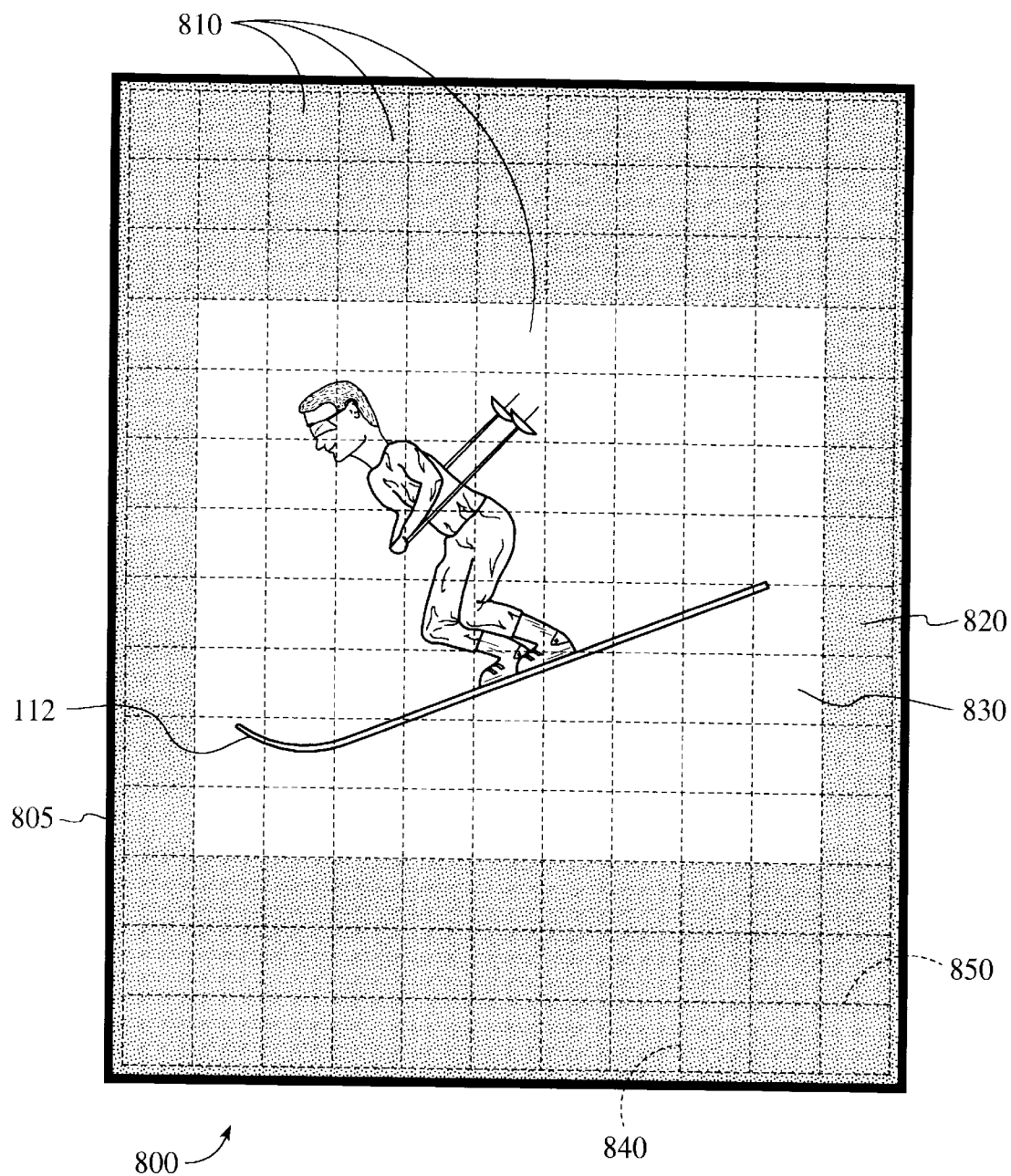
FIG. 8(b) is an image representation of the high contrast, showing the salient still image capture zones.

Referring now to FIG. 8(b), a second representation of high contrast image 800 is shown partitioned into salient image zones 810. Preferably, high contrast image 800 is partitioned into a plurality of square salient image zones 810 defined by vertical lines 840 and horizontal lines 850. Salient image zones 810 shown in FIG. 8(b) are not representative of the actual size or shape of zones, but are shown for illustrative purposes only. Those skilled in the art will recognize that the zones may vary in geometric shape, size, and aspect ratio.

High contrast image 800 is thus divided into a plurality of dark zones 820 and a plurality of bright zones 830. Because camera 110 does not have sufficient dynamic range to capture image detail in both dark zones 820 and bright zones 830, dark zones 820 appear black with no image detail and/or bright zones 830 appear white with no image detail. Thus, with a single exposure of high contrast image 800, camera 110 loses or is unable to capture substantial detail in either dark zones 820 or bright zones 830, or both.

Figure 9A:
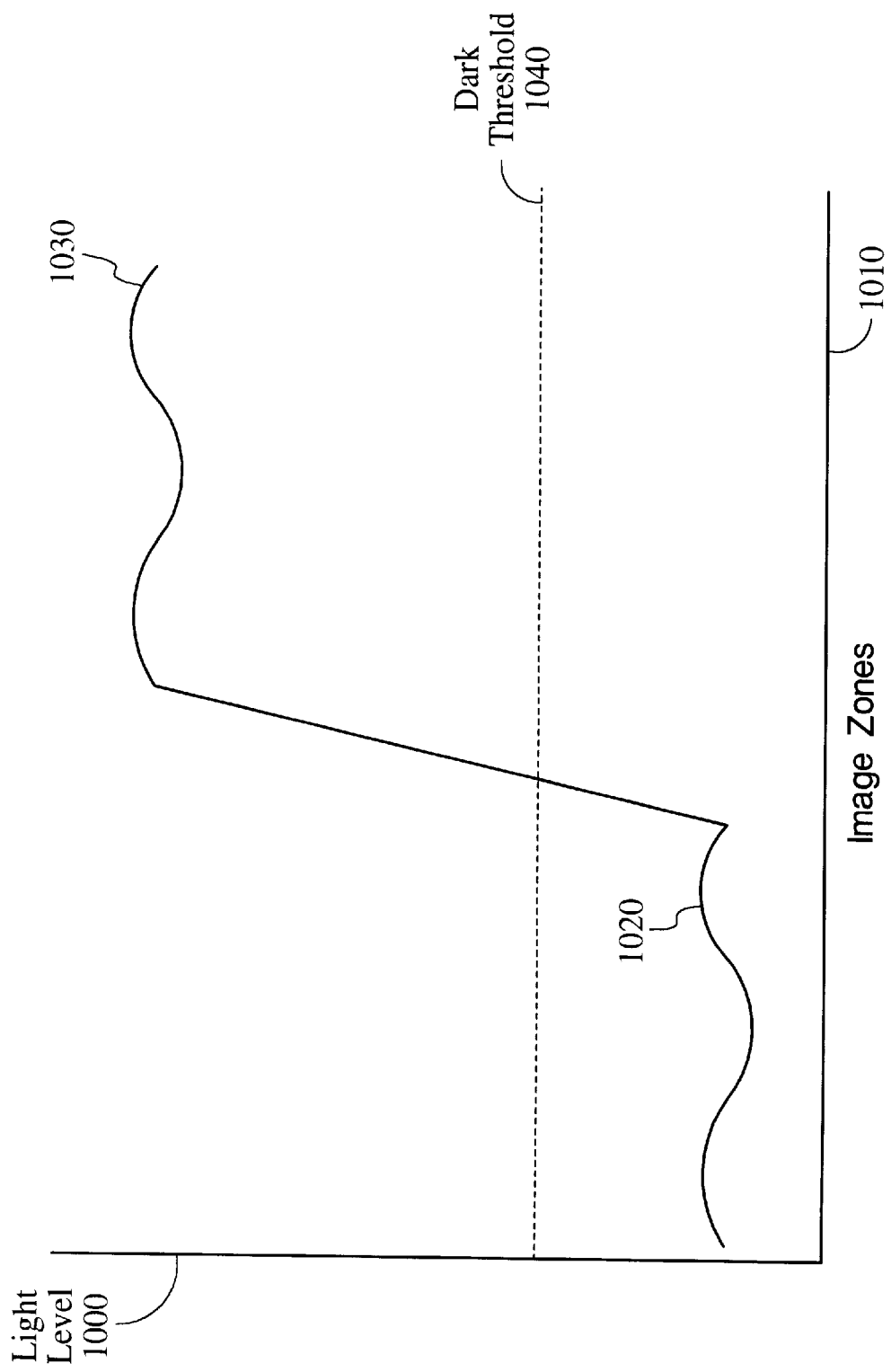
FIG. 9(a) is a graph representing the transition from a dark zone to a bright zone of the high contrast image of FIG. 8(b), with exposure adjusted for the brightest areas.

Referring now to FIG. 9(a), a graph representing the transition from dark zone 820 to bright zone 830 of high contrast image 800 is shown plotting light level 1000 versus image zones 1010. The exposure setting of camera 110 is adjusted for high contrast image's 800 bright area 860, according to the present embodiment. At this exposure, camera 110 is unable to detect any detail below dark threshold 1040. Any dark image data 1020 located in dark zone 820 is below dark threshold 1040. However, camera 110 is able to detect bright image data 1030 from bright zone 830. Thus, at this exposure setting, all image detail in dark zones 820 is lost but image detail in bright zones 830 is recorded by camera 110.

Figure 9B:
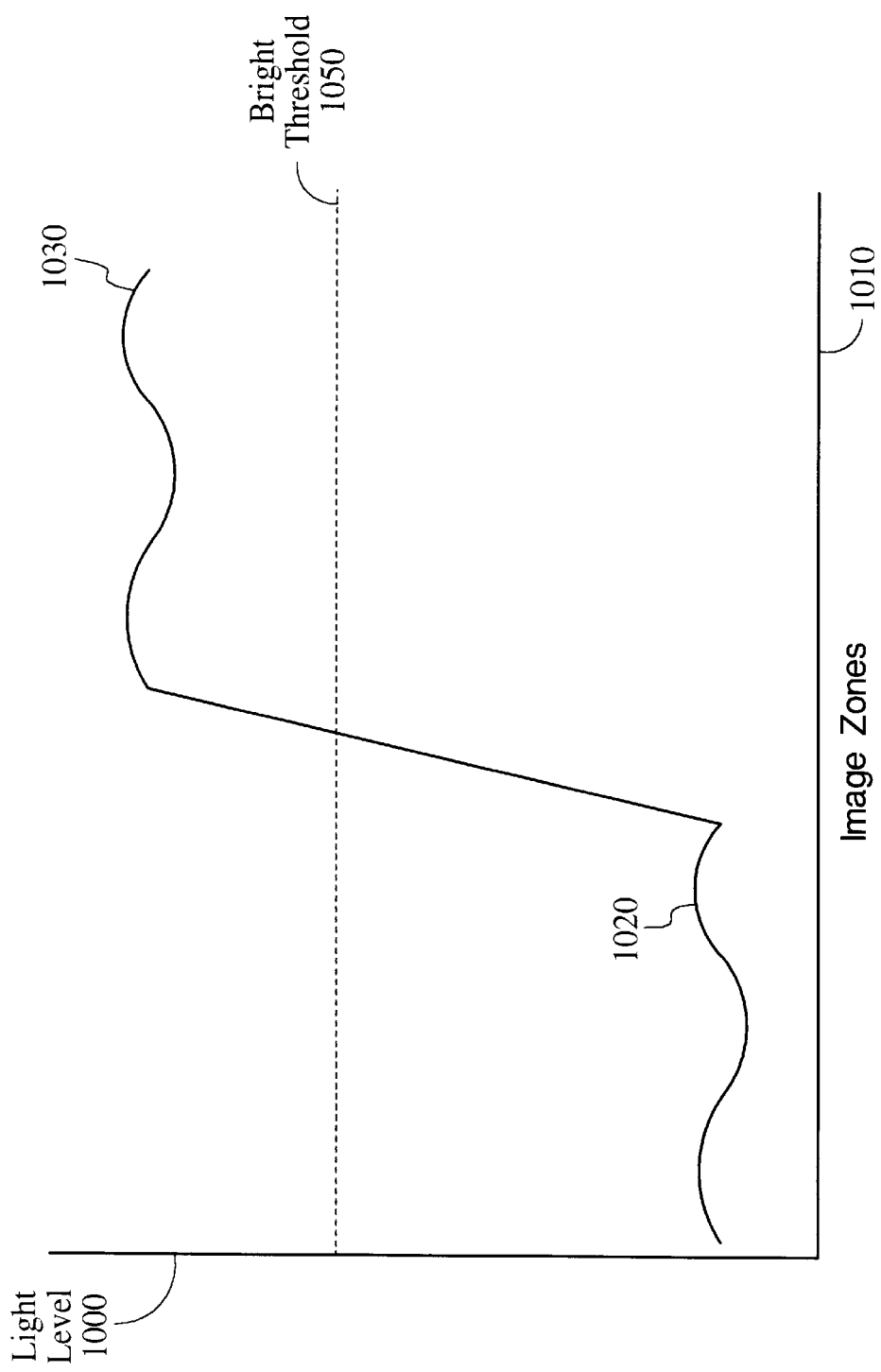
FIG. 9(b) is a graph representing the transition from a dark zone to a bright zone of the high contrast image of FIG. 8(b), with exposure adjusted for the darkest areas.

Referring to FIG. 9(b), on the other hand, a graph representing the transition from dark zone 820 to bright zone 830 is shown where camera 110 exposure is adjusted for high contrast image's 800 dark area 870. (FIG. 9(b) graphs light level 1000 versus plotted image zones 1010 of high contrast image 800.) Camera 110 is adjusted for high contrast image's 800 dark area 870, but at this exposure, camera 110 is unable to detect any detail above bright threshold 1050. Any bright image data 1030, located in bright zone 830, is above bright threshold 1050. However, camera 110 is able to detect light dark image data 1020 from dark zone 820. Thus, at the exposure setting for dark zones 820, all image detail in bright zone 830 is lost and image detail in dark zone 820 is captured by camera 110.

Figure 10A:
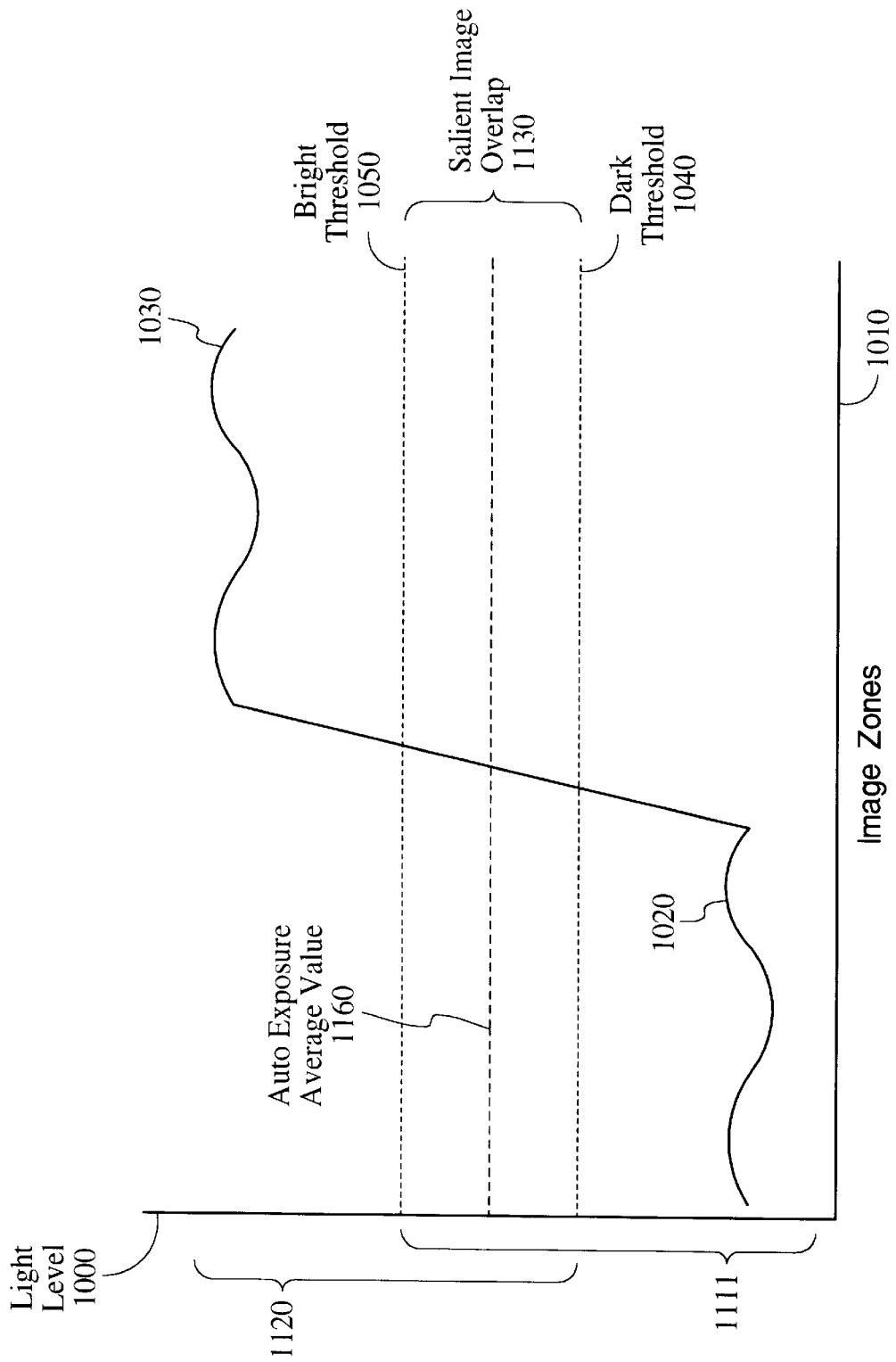
FIG. 10(a) is a graph representing the transition from a dark zone to a bright zone of the high contrast image of FIG. 8(b) showing bracketed exposures adjusted for both the lightest and darkest areas.

Referring now to FIG. 10(a), a graph representing light levels 1000 versus zones 1010 for the transition from dark zone 820 to bright zone 830 of high contrast image 800 is shown. In this first embodiment of the present invention, FIG. 10(a) shows the two salient still capture images: dark image 1111 where camera 110 exposure is automatically adjusted for dark areas 870, and bright image 1120 where camera 110 exposure is automatically adjusted for bright areas 860. Preferably, the exposures of the two salient still capture images are adjusted so that the image data captured in both salient images contains a small portion of data, represented by salient image overlap 1130, that is common to both captured images. That is, the two exposure settings are calculated to obtain a minimum amount of common image data to enable the eventual match-up of the two salient still capture images. Salient image overlap 1130 is the distance between dark threshold 1040 and bright threshold 1050.

Preferably, AE mechanism 420 averages all zones 810 together and treats each zone 810 as if all zones 810 have the same or equal brightness. This averaging hopefully results in an auto-exposure average value 1160 between bright areas 860 and dark area 870 of high contrast image 800. Capture manager 410 automatically adjusts the exposure setting for the first salient image by setting the exposure a pre-set value below (−X) the auto-exposure average value 1160 in order that dark image 1111 captures dark image data 1020 of dark area 870. Capture manager 410 then automatically adjusts the exposure setting for the second salient image by setting the exposure a pre-set value above (+X) the auto-exposure average value 1160 in order that bright image 1120 captures bright image data 1030 of bright area 860. These exposures are hopefully far enough apart to capture dark image data 1020 and bright image data 1030 while maintaining an optimum overlap 1130 in order to capture adequate image detail. Preferably, camera manager 410 captures two salient still capture images based upon the +X and −X values loaded during initial camera set-up. These values may be, for example, ½ f-stop above and ½ f-stop below the auto-exposure average value 1160.

Figure 10B:
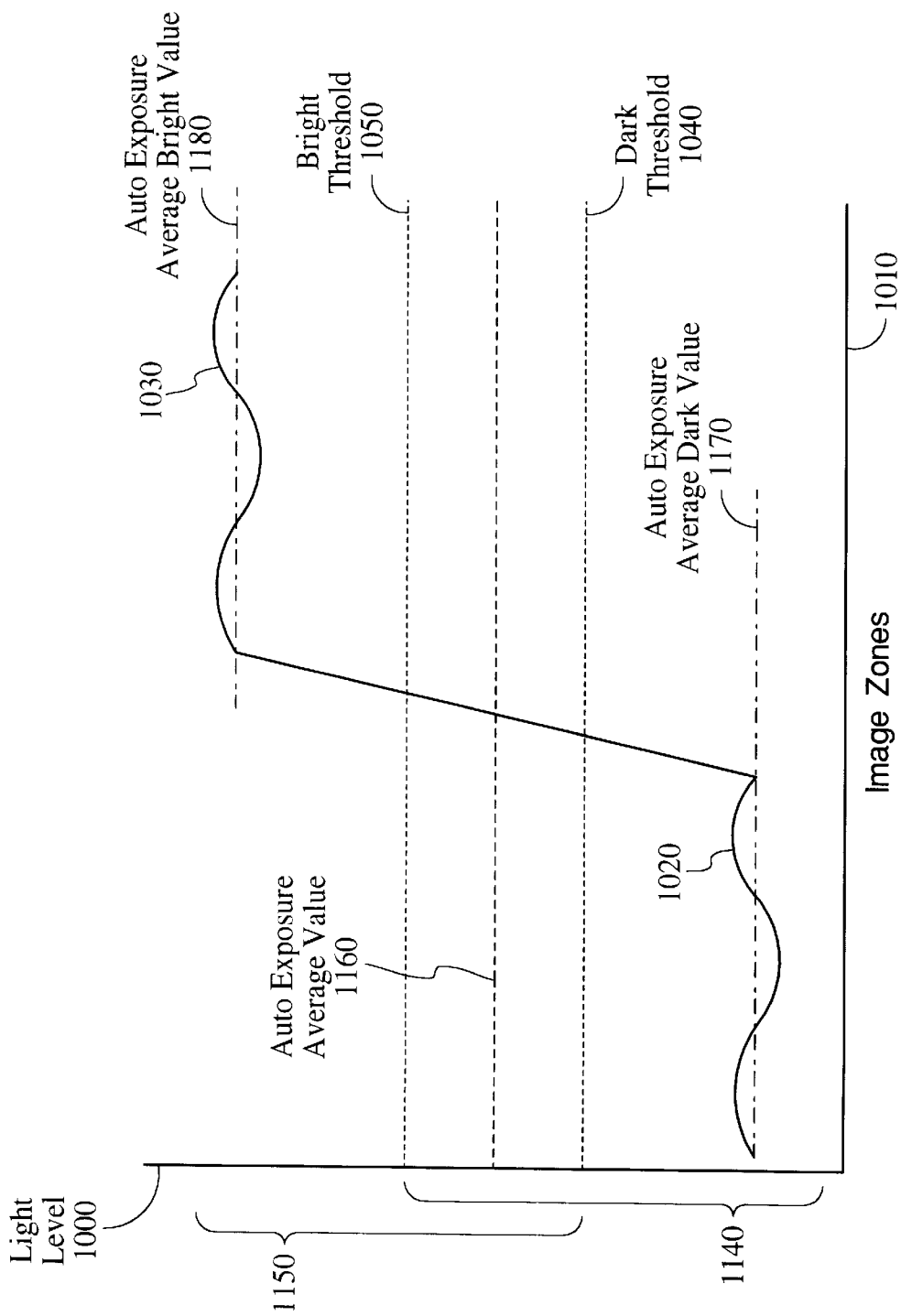
FIG. 10(b) is a graph representing the transition from a dark zone to a bright zone of the high contrast image of FIG. 8(b) showing bracketed exposures adjusted by the auto-exposure mechanism of the imaging device.

Referring now to FIG. 10(b), a graph representing light levels 1000 versus zones 1010 for the transition from dark zone 820 to bright zone 830 of high contrast image 800 is shown. In this second embodiment of the present invention, the FIG. 10(b) representation shows the effect of AE mechanism 420 settings of camera 110 in conjunction with the salient still capture of high contrast image 800. As in FIG. 10(a), the graph shows the transition from dark zone 830 to bright zone 820 of high contrast image 800.

In the FIG. 10(b) embodiment, AE mechanism 420 determines the auto-exposure average dark value 1170 of auto-exposure dark image 1140 and the auto-exposure average bright value 1180 of auto-exposure bright image 1150. AE mechanism 420 subtracts auto-exposure average dark value 1170 from auto-exposure average bright value 1180, divides the result by two (2), and uses this mean. value as the AE average. This process may require multiple exposures during the AE process because the required exposures need to be adjusted up or down in order for AE mechanism 420 to sense the darkest and brightest areas correctly and for AE mechanism 420 to obtain the proper exposure values. AE mechanism 420 then determines the number of images to capture based upon the difference between auto exposure average bright value 1180 and auto exposure average dark value 1170 (1180 minus 1170.) If the difference (1180 minus 1170) exceeds the dynamic range of the two captures with overlap, then three or more images are required. This method does not assume that the difference (1180 minus 1170) is within the range of −X below and +X above the AE average value 1160 as described in reference to FIG. 10(a). Rather, AE mechanism 420 uses the difference (1180 minus 1170) to determine the number of exposures required to cover all exposure levels between the two values (1180 and 1170.)

During operation of the AE mechanism 420, the invention may vary the exposure over several frames to determine the proper values for the auto-exposure average dark value 1170, the auto-exposure average bright value 1180, and the AE average. This analysis of a series of exposures, performed by multiple passes of the sensing system during the pre-capture AE calculation, would be done where the CCD dynamic range is exceed in order to prevent the clipping of image data outside the bright range of the CCD. Clipping occurs when the maximum capacity of the CCD is reached and data is lost. At the dark end, data is lost in the noise level of the image. Such clipping of image data and image noise would result in an inaccurate AE calculation, resulting in an inaccurate exposure.

Because the light level contrast between the two images may be great, camera 110 may not be able to effectively use the AE average and still maintain an optimum overlap 1130. Thus, in a further refinement of the present invention (not shown), the user is given the option of choosing between the method of capturing the images +X above and −X below AE average value 1160, and the method of capturing multiple images that span the range between auto-exposure average bright value 1180 and auto-exposure average dark value 1170. In such an embodiment, camera 110 reports both methods to the user on display 302 and allows the user to choose between the two methods of image capture.

Further enhancements of the invention could be achieved by more detailed analysis of the salient still images in memory. For example, camera control sub-system 418 could find the darkest and lightest pixels of high contrast image 800 and perform the analysis of the images on a pixel-by-pixel basis rather than on a zone basis.

Figure 11A:
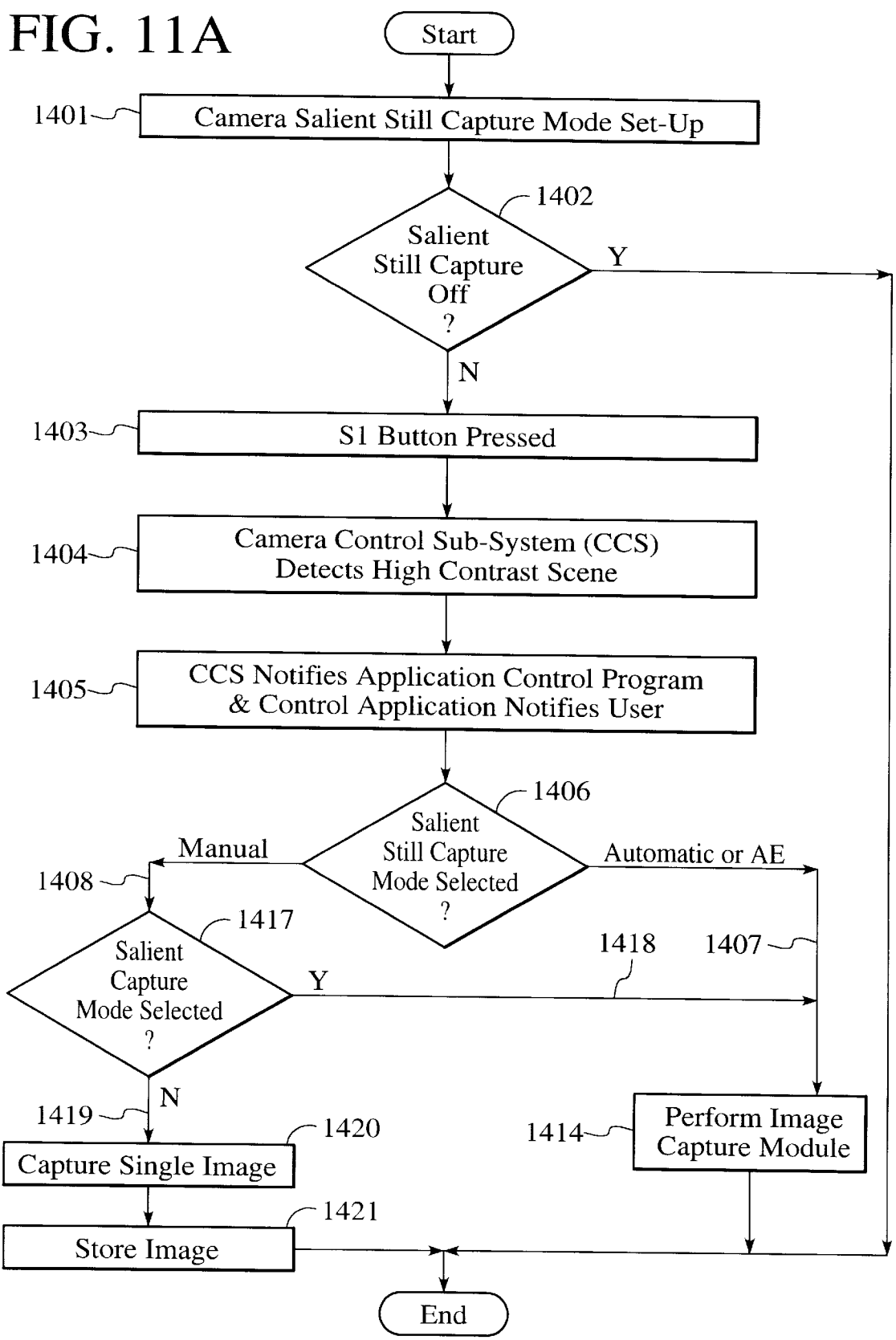
FIG. 11(a) is a flowchart of preferred method steps for generating and capturing salient still images, according to the present invention.

Referring now to FIG. 11(a), a flowchart of the preferred method steps to execute salient still capture module of the present invention is shown. Initially in step 1401, the user presses menu button 614 and selects mode set-up. Alternatively, the salient still capture mode may be selected by the use of programmer soft keys 616. Next, in step 1402, control application 400 determines if salient still capture mode is set to off. If salient still capture mode is not set to off, control application 400 continues processing the salient still capture module at step 1403. However, if salient still capture mode is set to off, control application 400 exits salient still capture module.

If salient still capture mode is selected, then, in step 1403, the user depresses shutter 618 to the S1 position which selects the AE mode of camera 110. Next, in step 1404, camera control sub-system (CCS) 418 detects high contrast image 800.

Next in step 1405, camera control sub-system 418 notifies control application 400 that camera control sub-system 418 has detected a high contrast image 800. In addition, control application 400 notifies the user that camera control sub-system 418 has detected high contrast image 800. Preferably, control application 400 notifies the user by a combination of text in LCD display 302 text warning area 640, icon warning light 650, or audio signal as described in reference to FIG. 6(c). This notification alerts the user that the camera operation may take longer to process the image because camera control sub-system 418 has detected high contrast image 800.

Next in step 1406, control application 400 determines whether the user has selected salient still capture (SSC) automatic mode, or manual mode. The preferred embodiment permits two possible user selections: (1) SSC automatic mode is selected 1407, or (2) manual SSC mode is selected 1408. If the user has selected manual SSC mode 1408, capture manager 412 performs the method steps beginning at step 1416.

Figure 11B:
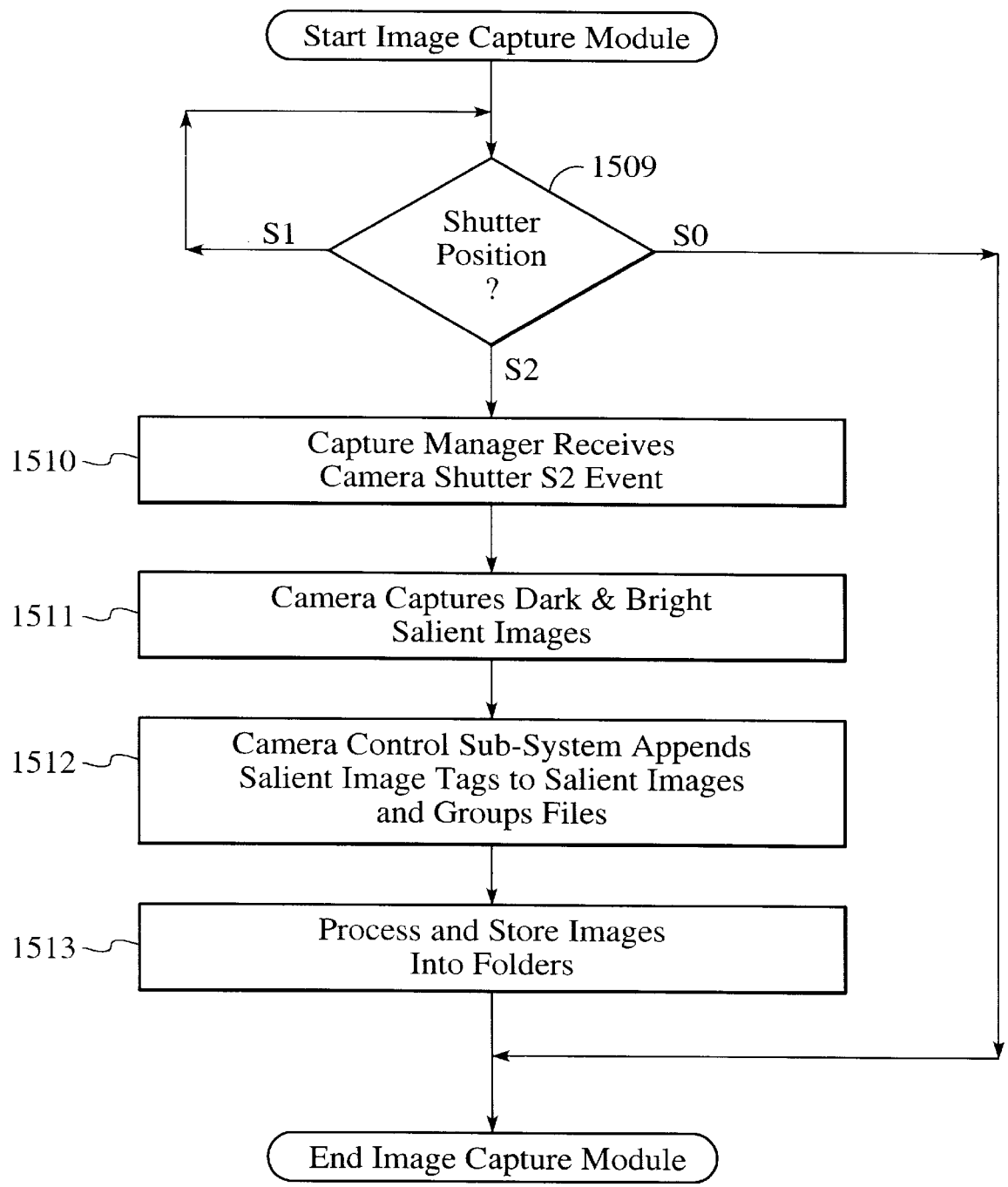
FIG. 11(b) is a flowchart of preferred method steps for performing the image capture module of the present invention.

If SSC automatic mode is selected 1407, capture manager 410, at step 1414, then executes the method steps necessary to perform the image capture module as represented in steps 1509 through 1513 of FIG. 11 (b).

In the preferred embodiment, after step 1414, capture manager 410 exits salient still capture mode and the salient still images are combined at a later time. Alternatively, after executing the image capture module at step 1414, capture manager 410 may combine the salient still images into a single image. Any of a series of known merging techniques may be used to match the two images. Such techniques may include the following: (1) determining an offset to achieve spatial alignment and aligning the images on a pixel-by-pixel basis, (2) determining common areas of the two images and adjusting the exposure overlapping areas so that the common areas are equal in brightness, (3) selecting pixels form the dark image where the pixels are below the darkest area of the exposure overlapped area, or (4) selecting pixels from the light image where the pixel is above the brightest area of the exposure overlapped area. In techniques 3 and 4 above, it is customary to use a transfer function to reduce the dynamic range of the final image. The combination of the two salient still images may be performed at the time of capture or, preferably, at a subsequent time.

If, at step 1406, control application 400 determines that the user selected manual SSC mode 1408, capture manager 410, at step 1417, preferably determines which of two possible user events have been selected: (1) salient still capture mode 1418, or (2) user override event 1419. If the user has selected salient still capture mode 1418, capture manager 410 proceeds as described above for automatic SSCM capture in reference to step 1414. However, if the user has selected user override event 1419, capture manager 410, at step 1420, captures a single image. Then, at step 1421, capture manager 410 stores the single image in memory.

Referring now to FIG. 11(*b*), a flowchart of preferred method steps performed by image capture module (represented as step 1409 in FIG. 11(*a*)) is shown. Initially at step 1509, the user chooses whether to proceed with salient still capture by either depressing shutter 618 to the S2 position or releasing shutter 618 to the S0 position. If shutter 618 is in the S0 or released position, control manager 410 returns control to control application 400 and does not process the salient still images. If shutter 618 is in the S1 position, control application 400 waits until shutter 618 position is changed.

However, once the user depresses shutter 618 to the S2 position, control application 400, at step 1510, is notified that shutter 618 is in the S2 position and control application 400 notifies capture manager 410 of the S2 event. Preferably, this event occurs when the user lightly depresses camera shutter 618. By depressing the camera shutter 618 from the S1 position to the S2 position, the user has indicated to control application 400 to proceed with capturing the salient still images.

Next, in step 1511, capture manager 410 preferably directs camera control sub-system 418 to capture dark image 1120 and bright image 1130 based upon the +X and –X values passed to control application 400 in step 1404 of FIG. 11(*a*). The +X value is saved as tag information in bright image file 1306 and the –X value is saved as tag information in dark image file 1304.

Alternatively, camera control sub-system 418 may notify capture manager 410 if more than two images must be captured and what values to use for +X and –X. Preferably, this could be accomplished by including the total count of images taken within image tags 1302. Placing shutter 618 in the S2 position then causes a first image to be captured. Image tag 1302 includes exposure values, a salient tag 1/n where n is the number of images to capture. Capture manager 410 then requests a second image, which is tagged as 2/n. This is repeated until n images have been captured. The difference in exposures is not passed from capture manager 410 to camera control sub-system 418, but rather returned as tag information with the associated salient still image file within salient still capture image folder 1300.

Next, in step 1512, capture manager 410 preferably appends salient still capture image tags 1302 to dark image file 1304 and bright image file 1306 as described in reference to FIG. 7. Alternatively, capture manager 410 appends a plurality of salient still capture image tags 1302 to a plurality of image files. Finally, in step 1513, capture manager 410 groups the images together in salient still capture image folder 1300 and adds optional salient still capture name 1308 to image folder 1300.

The invention has been explained above with reference to a preferred embodiment. Other embodiments will be apparent to those skilled in the art in light of this disclosure. For example, the present invention may be readily implemented using configurations other than those described in the preferred embodiment above. Additionally, the present invention may effectively be used in conjunction with systems other than the one described above as the preferred embodiment. Therefore, these and other variations upon the preferred embodiments are intended to be covered by the present invention, which is limited only by the appended claims.

What is claimed is:

1. A system for capturing salient still images in an electronic imaging device having a display, said system comprising:
   means for allowing a user to turn on a salient still capture mode;
   means for automatically detecting a high contrast image;
   means for notifying said user of the presence of said high contrast image using at least one of a warning light, an audio signal, or text displayed in said display;
   means for determining whether an automatic salient still capture mode or a manual salient still capture mode has been selected;
   means responsive to a shutter button depression for capturing a bright image of an object at a first exposure level, and capturing a dark image of said object at a second exposure level;
   means for combining said bright and dark images into a single image to thereby increase the dynamic range of said electronic imaging device;
   means for appending a tag to said bright image and to said dark image to mark said images as salient still images; and
   means for storing said bright and dark images in a salient still capture image folder.

2. The system of claim 1, further comprising
   means for supplying a high exposure value to said electronic imaging device;
   means for supplying a low exposure value to said electronic imaging device;
   means for determining an average exposure level of said high contrast image;
   means for setting said first exposure level of said bright image at said high exposure value above said average exposure level; and
   means for setting said second exposure level of said dark image at said low exposure value below said average exposure level.

3. The system of claim 1, further comprising:
   means for storing said plurality of salient still images in the salient still capture image folder; and
   means for storing said salient still capture image folder in a computer-readable storage medium.

4. The system of claim 1, further comprising:
   means for appending a salient still capture name to said salient still capture image folder; and
   means for appending a plurality of salient still capture image tags to each of said plurality of salient still images.

5. The system of claim 1, further comprising:
   means for calculating an average bright exposure value;
   means for calculating an average dark exposure value; and
   means for calculating an exposure difference from said average dark exposure value to said average bright exposure value.

6. The system of claim 5, further comprising:
   means for determining a necessary number of salient still images required to cover said exposure difference; and
   means for capturing said necessary number of salient still images between said average dark exposure value and said average bright exposure value.

7. A method of capturing salient still images in an electronic imaging device have a display, said method comprising the steps of:

allowing a user to turn on a salient still capture mode;

automatically detecting a high contrast image;

notifying said user of the presence of said high contrast image using at least one of a warning light, an audio signal, or text displayed in said display;

determining whether an automatic salient still capture mode or a manual salient still capture mode has been selected;

in response to said user pressing shutter button, capturing a bright image of an object at a first exposure level, and capturing a dark image of said object at a second exposure level;

combining said bright and dark images into a single image to thereby increase the dynamic range of said electronic imaging device;

appending a tag to said bright image and to said dark image to mark said images as salient still images; and storing said bright and dark images in a salient still capture image folder.

8. The method of claim 7, further comprising the steps of:

supplying a high exposure value to said electronic imaging device;

supplying a low exposure value to said electronic imaging device;

determining an average exposure level of said high contrast image;

setting said first exposure level of said bright image at said high exposure value above said average exposure level; and setting said second exposure level of said dark image at said low exposure value below said average exposure level.

9. The method of claim 7, wherein said first exposure level and said second exposure level optimally overlap each other by a minimum exposure value.

10. The method of claim 7, further comprising the step of:

selecting the salient still capture mode on said electronic imaging device;

wherein said mode of operation is selected from manual, automatic, and inactive.

11. The method of claim 10, further comprising the steps of:

receiving a manual user event;

determining the value of said manual user event value;

manually capturing a single electronic image by said electronic imaging device; and storing said single electronic image in a computer-readable storage medium.

12. The method of claim 7, further comprising the steps of:

storing said bright and dark images in the salient still capture image folder; and storing said salient still capture image folder in a computer-readable storage medium.

13. The method of claim 12, further comprising the steps of:

appending a salient still capture name to said salient still capture image folder; and appending a plurality of salient still capture image tags to each of said plurality of salient still images.

14. The method of claim 7, further comprising the step of:

partitioning said high contrast image into a plurality of salient image zones.

15. The method of claim 7, further comprising the steps of:

calculating an average bright exposure value;

calculating an average dark exposure value; and calculating an exposure difference from said average dark exposure value to said average bright exposure value.

16. The method of claim 15, further comprising the steps of:

determining a necessary number of salient still images required to cover said exposure difference; and capturing said necessary number of salient still images between said average dark exposure value and said average bright exposure value.

17. A computer-readable medium comprising program instructions for the capture of salient still images in an electronic imaging device having a display, by performing the steps of:

allowing a user to turn on a salient still capture mode;

automatically detecting a high contrast image;

notifying said user of the presence of said high contrast image using at least one of a warning light, an audio signal, or text displayed in said display;

determining whether an automatic salient still capture mode or a manual salient still capture mode has been selected;

in response to said user pressing a shutter button, capturing bright image of an object at a first exposure level, and capturing a dark image of said object at a second exposure level;

combining said bright and dark images into a single image to thereby increase the dynamic range of said electronic imaging device;

appending a tag to said bright image and to said dark image to mark said images as salient still images; and storing said bright and dark images in a salient still capture image folder.

18. The computer-readable medium of claim 17, further comprising the steps of:

supplying a high exposure value to said electronic imaging device;

supplying a low exposure value to said electronic imaging device;

determining an average exposure level of said high contrast image;

setting said first exposure level of said bright image at said high exposure value above said average exposure level; and setting said second exposure level of said dark image at said low exposure value below said average exposure level.

19. The computer-readable medium of claim 17, wherein said first exposure level and said second exposure level optimally overlap each other by a minimum exposure value.

20. The computer-readable medium of claim 17, further comprising the steps of:

storing said bright and dark images in the salient still capture image folder; and storing said salient still capture image folder in a computer-readable storage medium.

21. The computer-readable medium of claim 20, further comprising the steps of:

appending a salient still capture name to said salient still capture image folder; and appending a plurality of salient still capture image tags to each of said plurality of salient still images.

22. The computer-readable medium of claim 17, further comprising the steps of:

calculating an average bright exposure value;

calculating an average dark exposure value; and calculating an exposure difference from said average dark exposure value to said average bright exposure value.

23. The computer-readable medium of claim 22, further comprising the steps of:

determining a number n of salient still images required to cover said exposure difference; and capturing said number n of salient still images between said average dark exposure value and said average bright exposure value.

* * * * *